United States Patent
Adams (10) Patent No.: US 9,413,764 B2
(45) Date of Patent: Aug. 9, 2016

(54) FUZZING SERVER RESPONSES TO MALICIOUS CLIENT DEVICES

(71) Applicant: Juniper Networks, Inc., Sunnyvale, CA (US)

(72) Inventor: Kyle Adams, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 239 days.

(21) Appl. No.: 14/042,156

(22) Filed: Sep. 30, 2013

(65) Prior Publication Data

US 2015/0095507 A1 Apr. 2, 2015

(51) Int. Cl.
*G06F 15/16* (2006.01)
*H04L 29/06* (2006.01)
*G06F 11/36* (2006.01)
*H04L 29/08* (2006.01)

(52) U.S. Cl.
CPC ............ *H04L 63/10* (2013.01); *G06F 11/3664* (2013.01); *G06F 11/3684* (2013.01); *H04L 63/1441* (2013.01); *H04L 67/28* (2013.01)

(58) Field of Classification Search
USPC .......................................... 709/229; 715/234
See application file for complete search history.

(56) References Cited

U.S. PATENT DOCUMENTS

| 2008/0301647 | A1 | 12/2008 | Neystadt et al. |
| 2009/0164478 | A1 | 6/2009 | Natanov et al. |
| 2011/0282997 | A1 | 11/2011 | Prince et al. |
| 2012/0117458 | A1* | 5/2012 | Holloway et al. ............. 715/234 |

OTHER PUBLICATIONS

Wikipedia, "Fuzz testing", http://en.wikipedia.org'w/index.php?title=Fuzz_testing&oldid=566555205. Jul. 31, 2013, 5 pages.
Extended European Search Report corresponding to EP 14 18 6511.3 mailed Feb. 5, 2015, 6 pages.

* cited by examiner

*Primary Examiner* — Kyung H Shin
(74) *Attorney, Agent, or Firm* — Harrity & Harrity, LLP (57) ABSTRACT

A security device may receive a request, from a client device and intended for a server device, to provide a resource. The resource may be associated with information stored by the server device. The security device may identify the request as being associated with a malicious script. The malicious script may execute on the client device and may include a script that performs one or more undesirable tasks directed to the server device. The security device may receive, from the server device, a response to the request. The response may include information associated with the requested resource. The security device may modify the response to form a modified response. The response may be modified in an attempt to cause the malicious script to experience an error. The security device may provide the modified response to the client device.

20 Claims, 9 Drawing Sheets

FUZZING SERVER RESPONSES TO MALICIOUS CLIENT DEVICES

BACKGROUND

Fuzz testing is a technique that may be used to discover problems (e.g., coding errors, security loopholes, etc.) included in a program, an operating system, a network, or the like. For example, a fuzz test, associated with a system, may be executed by inputting randomized data (e.g., fuzz) into the system in an attempt to make the system crash.

SUMMARY

According to some possible implementations, a security device may include one or more processors to: receive a request, from a client device and intended for a server device, to provide a resource, where the resource may be associated with information stored by the server device; identify the request as being associated with a malicious script, where the malicious script may execute on the client device and include a script that performs one or more undesirable tasks directed to the server device; receive, from the server device, a response to the request, where the response may include information associated with the requested resource; modify the response to form a modified response, where the response may be modified in an attempt to cause the malicious script to experience an error; and provide the modified response to the client device.

According to some possible implementations, a computer-readable medium may store one or more instructions that, when executed by one or more processors, cause the one or more processors to: receive, from a client device, a request for information stored by a server device; determine that the request is associated with a script, where the script may include an automated performance of one or more undesirable tasks directed to the server device; receive a response to the request, where the response may include information associated with the requested information, and where the response may be provided by the server device; modify the response to form a modified response, where the response may be modified to alter the information included in the response; and provide, to the client device, the modified response to cause the script to experience an error that causes the script to crash.

According to some possible implementations, a method may include: receiving, by a security device, a request to provide information associated with a resource associated with a server device; identifying, by the security device, the request as being associated with a script that performs one or more undesirable tasks on the server device; receiving, by the security device, a response associated with the request, where the response may be provided by the server device; modifying, by the security device, the response associated with the request, where modifying the response may include altering one or more portions of information included in the response; and sending, by the security device, the modified response to attempt to cause the script to crash.

DETAILED DESCRIPTION

The following detailed description of example implementations refers to the accompanying drawings. The same reference numbers in different drawings may identify the same or similar elements.

A script may include a set of one or more tasks that are to be automatically performed by a client device (e.g., without any user interaction). A client device may launch a script against a server device (e.g., a server device associated with a website) for a malicious purpose (e.g., to launch an exploit, to scrape website content, etc.). As such, it may be desirable to prevent the malicious script from accessing information associated with the server device. One method of preventing the malicious script from accessing information associated with the server device is configured to cause the script to stop running altogether (e.g., by causing the malicious script to experience a fatal error that may cause the malicious script to crash). The malicious script may experience a fatal error when the script is provided with a modified (e.g., fuzzed) response (e.g., an intentionally malformed response, associated with a request made to the server device, that includes one or more errors), where a browser (e.g., being used by a user) may not experience a fatal error due to the modified response. Implementations described herein may allow a security device, associated with a server device, to provide a modified response to a client device running a malicious script in an attempt to cause the malicious script to crash (e.g., thereby protecting the server device from the malicious script).

Figure 1:
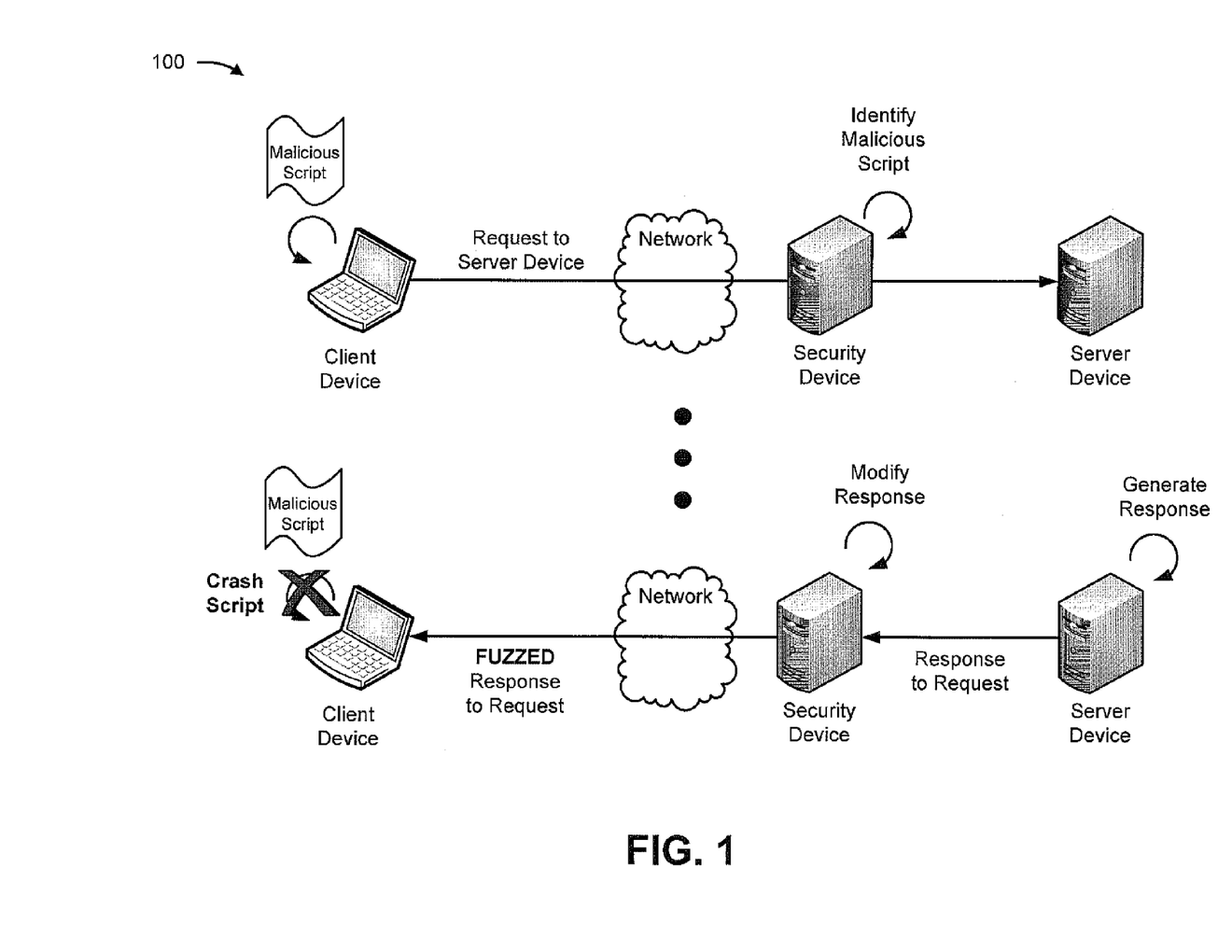
FIG. 1 is a diagram of an overview of an example implementation described herein.

FIG. 1 is a diagram of an overview of an example implementation 100 described herein. For the purposes of FIG. 1, assume that a client device is executing a script to access information associated with a server device (e.g., associated with a website) for a malicious purpose (e.g., to launch an exploit, to scrape website content, etc.). Further, assume a security device is positioned to protect the server device from the malicious script.

As shown in FIG. 1, assume that the client device sends a request destined for the server device (e.g., based on running the malicious script). As further shown, the security device may receive the request and may identify the request as being associated with a malicious script. As shown, the server device may receive the request (e.g., via the security device) and may generate a response to the request. The server device may send the response to the security device, as shown.

As further shown in FIG. 1, the security device may modify the response to generate a modified response (e.g., a response that may cause the malicious script to crash), and may provide the modified response to the client device. As further shown, the client device may receive the modified response, and the malicious script may crash (e.g., due to the modified response received from the security device). In this way, a security device may provide a modified response to a client device running a malicious script that may cause the malicious script to crash (e.g., thereby protecting a server device from the malicious script).

Figure 2:
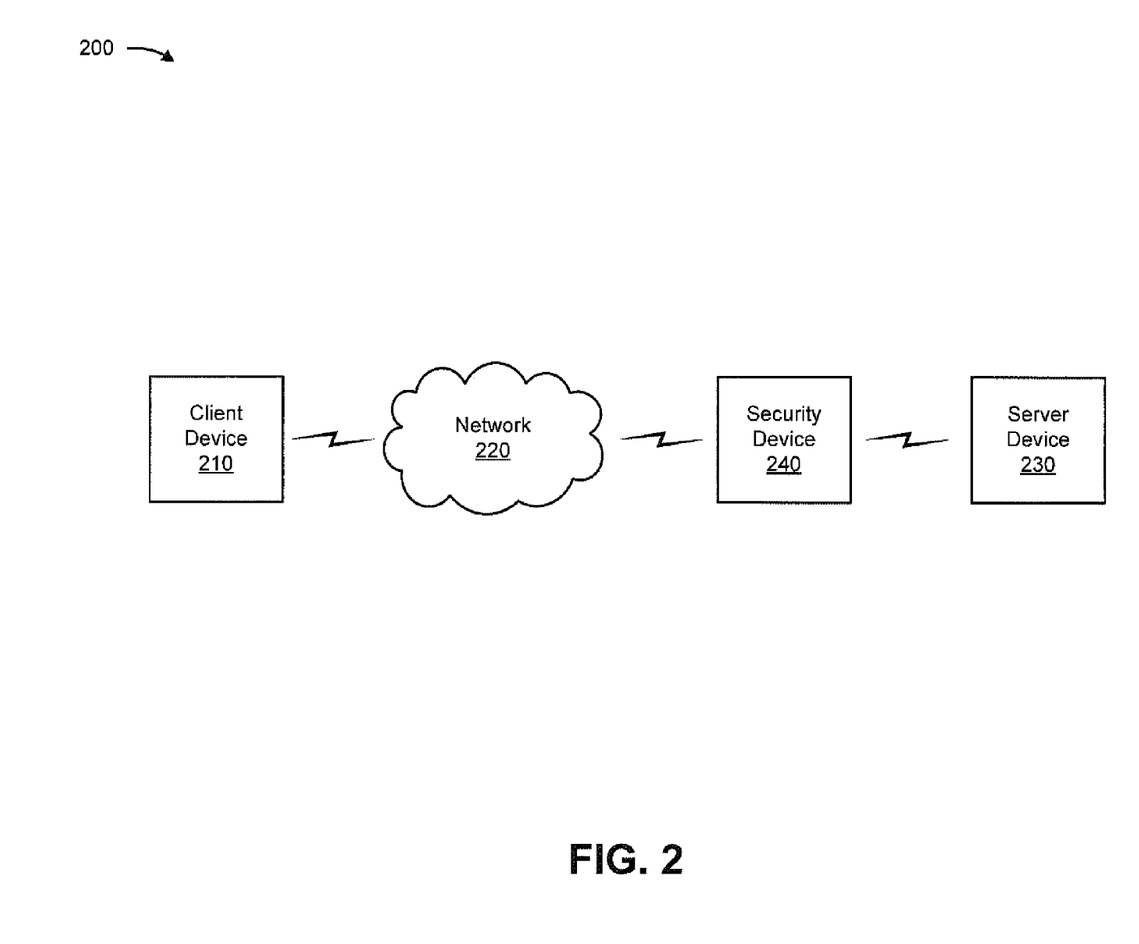
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a client device 210, a network 220, a service device 230, and a security device 240.

Client device 210 may include one or more devices capable of communicating with other devices (e.g., server device 230) via a network (e.g., network 220), and/or capable of receiving information provided by another device (e.g., server device 230). For example, client device 210 may include a computing device, such as a laptop computer, a tablet computer, a handheld computer, a desktop computer, a mobile phone (e.g., a smart phone, a radiotelephone, etc.), a personal digital assistant, or a similar device. In some implementations, client device 210 may be capable of running a script that requests information from another device, such as server device 230, via network 220.

Network 220 may include one or more wired and/or wireless networks. For example, network 220 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 220 may allow communication between devices, such as client device 210, server device 230, and/or security device 240.

Server device 230 may include one or more devices capable of receiving, providing, generating, storing, and/or processing information received and/or provided via a network (e.g., network 220) and/or another device (e.g., security device 240). For example, server device 230 may include a computing device, such as a server (e.g., an application server, a content server, a host server, a web server, etc.). In some implementations, server device 230 may receive information from and/or provide information to client device 210 (e.g., via network 220 and/or security device 240). Additionally, or alternatively, server device 230 may be capable of generating a response to a request received from another device (e.g., client device 210).

Security device 240 may include one or more devices capable of receiving, providing, generating, storing, and/or processing information received and/or provided via a network (e.g., network 220) and/or another device (e.g., server device 230). For example, security device 240 may include a computing device, such as a server. In some implementations, security device 240 may receive information from and/or provide information to client device 210 (e.g., via network 220) and/or server device 230. Additionally, or alternatively, security device 240 may include one or more devices capable of processing and/or transferring communications (e.g., a request, a response, etc.) between client device 210 and server device 230. For example, security device 240 may include a network device, such as a reverse proxy, a server (e.g., a proxy server), a traffic transfer device, a firewall, a router, a load balancer, or the like.

In some implementations, security device 240 may be capable of identifying a request as being associated with a malicious script. Additionally, or alternatively, security device 240 may be capable of modifying information (e.g., by inserting additional information, by removing portions of the information, by modifying the information, by fuzzing information, etc.) associated with a response (e.g., provided by a server device 230) to a request (e.g., made by client device 210) associated with a malicious script.

Security device 240 may be used in connection with a single server device 230 or a group of server devices 230 (e.g., a data center). Communications may be routed through security device 240 to reach the one or more server devices 230. For example, security device 240 may be positioned within a network as a gateway to a private network that includes one or more server devices 230.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
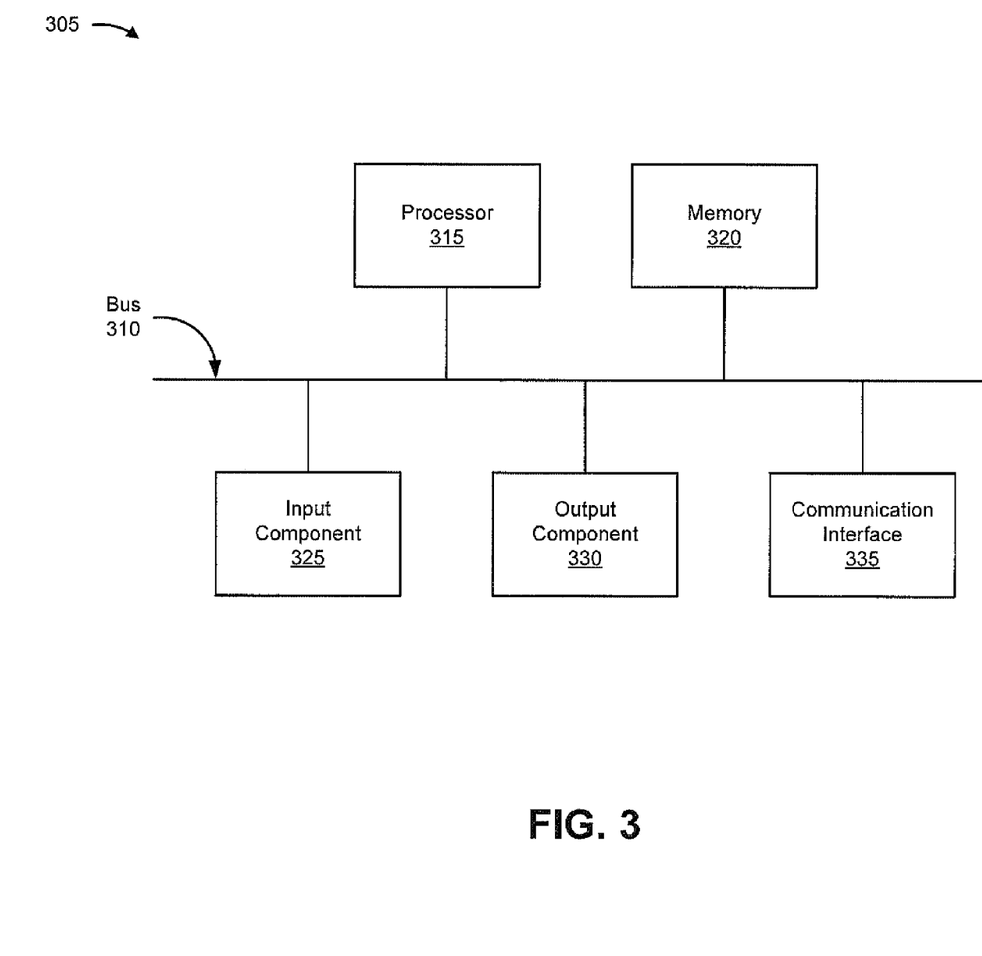
FIG. 3 is a diagram of example components of one or more devices of FIG. 2.

FIG. 3 is a diagram of example components of a device 300. Device 300 may correspond to client device 210, server device 230, and/or security device 240. Additionally, or alternatively, each of client device 210, server device 230, and/or security device 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
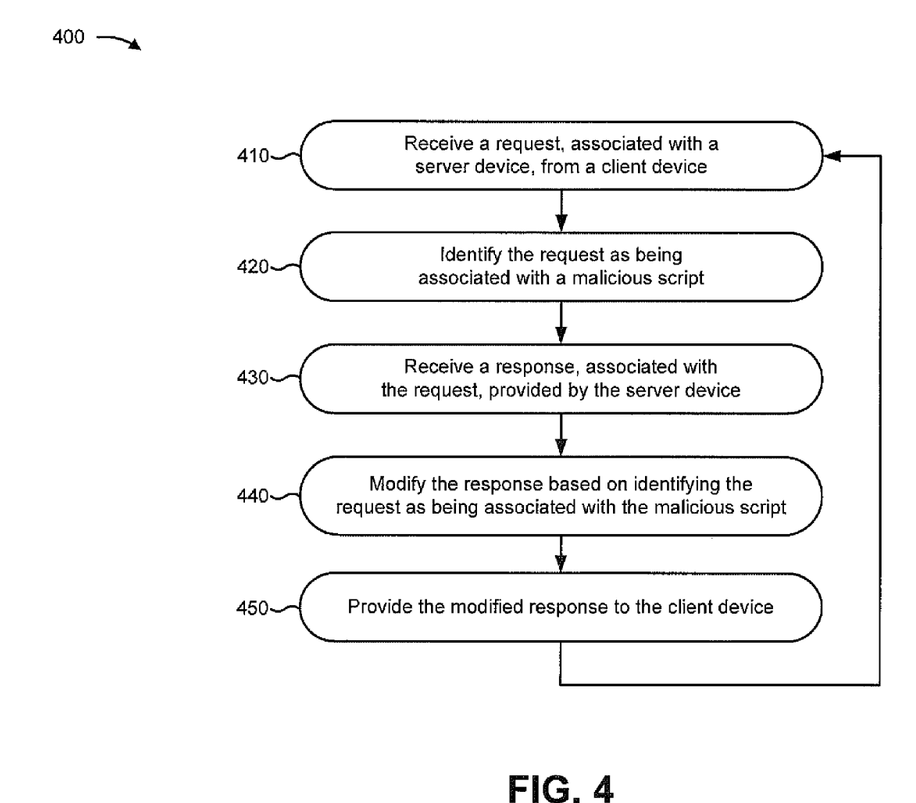
FIG. 4 is a flow chart of an example process for modifying a response, to be provided to a client device, to cause a malicious script, executing on with the client device, to experience a fatal error.

FIG. 4 is a flow chart of an example process 400 for modifying a response, to be provided to a client device, to cause a malicious script, executing on the client device, to experience a fatal error. In some implementations, one or more process blocks of FIG. 4 may be performed by security device 240. In some implementations, one or more process blocks of FIG. 4 may be performed by another device or a group of devices separate from or including security device 240, such as server device 230.

As shown in FIG. 4, process 400 may include receiving a request, associated with a server device, from a client device (block 410). For example, security device 240 may receive a request, associated with server device 230, from client device 210. In some implementations, security device 240 may receive the request from client device 210 when client device 210 sends the request via network 220. In some implementations, security device 240 may receive the request before server device 230 receives the request (e.g., security device 240 may be positioned between client device 210 and server device 230 within network 220).

A request may include a message, sent from client device 210 to server device 230 (e.g., via security device 240 and/or network 220), that identifies a resource (e.g., a HyperText Markup Language ("HTML") file, an image file, a video file, an audio file, etc.) that client device 210 wishes to receive from server device 230. In some implementations, the request may be associated with a particular application protocol, such as HyperText Transfer Protocol ("HTTP"), HyperText Transfer Protocol Secure, File Transfer Protocol, or the like. For example, client device 210 may send an HTTP request for an HTML file associated with a web address (e.g., a uniform resource locator ("URL")) of a website hosted by server device 230.

In some implementations, the request may include information that identifies client device 210 (e.g., a string of characters that identifies client device, 210, a network address associated with client device 210, a port number associated with client device 210, etc.). Additionally, or alternatively, the request may include information that identifies server device 230 (e.g., a string of characters that identifies server device 230, a network address associated with server device 230, a port number associated with server device 230, a URL associated with a website hosted by server device 230, etc.). Additionally, or alternatively, the request may include information that identifies the resource requested by client device 210, such as a uniform resource identifier ("URI").

In some implementations, security device 240 may receive the request based on information included in the request. For example, security device 240 may receive the request based on an IP address, associated with server device 230, included in the request (e.g., when security device 240 is positioned to receive requests destined for server device 230). As an additional example, security device 240 may receive the request based on information associated with a website (e.g., a URL) included in the request (e.g., when security device 240 is configured to receive requests associated with the website).

As further shown in FIG. 4, process 400 may include identifying the request as being associated with a malicious script (block 420). For example, security device 240 may identify the request, received from client device 210, as being associated with a malicious script. In some implementations, security device 240 may identify the request as being associated with the malicious script when security device 240 receives the request from client device 210 (e.g., after security device 240 receives the request). Additionally, or alternatively, security device 240 may identify the request as being associated with the malicious script when security device 240 receives information, associated with the request, from server device 230.

In some implementations, security device 240 may identify the request as being associated with the malicious script based on information included in the request. For example, security device 240 may identify the request as being associated with the malicious script based on information (e.g., a network address) that identifies client device 210 (e.g., when client device 210 is known to have run a malicious script in the past or is known to be associated with malicious activity). Additionally, or alternatively, security device 240 may identify the request as being associated with the malicious script based on activity related to one or more other requests received from client device 210. For example, security device 240 may receive, from client device 210, a quantity of requests (e.g., a quantity of requests associated with several links on a website), which may be indicative of undesirable scripted activity (e.g., spidering, scraping, etc.). As an additional example, security device 240 may identify the request as being associated with a malicious script based on receiving a quantity of requests that satisfies a threshold quantity of requests (e.g., when the quantity of requests received exceeds the threshold quantity of requests, security device 240 may identify the request as being associated with the malicious script, etc.). As an another example, security device 240 may identify the request as being associated with a malicious script based on receiving a quantity of requests within a particular threshold amount of time (e.g., when the quantity of requests are received within the threshold amount of time, security device 240 may identify the request as being associated with the malicious script, etc.).

In some implementations, security device 240 may identify the request as being associated with the malicious script based on receiving a request with a known attack signature (e.g., security device 240 may store information that identifies the known attack signature, and may recognize the attack signature based on the content of the request). In some implementations, security device 240 may identify the request as being associated with a malicious script based on information associated with one or more previous requests (e.g., a server log stored by security device 240 and/or server device 230 that indicates that the request may be associated with the malicious script).

In some implementations, security device 240 may identify the request as being associated with the malicious script based on a probability, determined by security device 240, that the request is associated with the malicious script. For example, security device 240 may determine (e.g., based on information associated with the request, based on information associated with client device 210, based on information associated with another request received from client device 210, etc.) a score, associated with the request, and the score may reflect a probability that the request is associated with the malicious script. In this example, if the score satisfies a threshold, then security device 240 may identify the request as being associated with the malicious script. Conversely, if the score does not satisfy the threshold, then security device 240 may not identify the request as being associated with the malicious script.

In some implementations, security device 240 may store information based on identifying the request as being associated with the malicious script, such as information that identifies client device 210 (e.g., a network address, etc.), information, associated with the request, used to identify the request as being associated with the malicious script (e.g., a date the request was received, a time the request was received, etc.), or the like. In some implementations, security device 240 may forward the request to server device 230 when security device 240 identifies the request as being associated with the malicious script.

In some implementations, security device 240 may identify the request as being associated with the malicious script, and security device 240 may generate a fabricated response (e.g., a response that does not include information responsive to the request). In this case, security device 240 may provide the fabricated response to client device 210 (e.g., without forwarding the request to server device 230 and/or receiving a response to the request from server device 230).

As further shown in FIG. 4, process 400 may include receiving a response, associated with the request, provided by the server device (block 430). For example, security device 240 may receive a response, associated with the request (e.g., the request made using the malicious script) provided by server device 230. In some implementations, security device 240 may receive the response when server device 230 sends the response to security device 240.

In some implementations, security device 240 may receive the response based on identifying the request as being associated with the malicious script. For example, security device 240 may identify the request as being associated with the malicious script (e.g., based on the request made by client device 210) and may receive a response (e.g., a response to the request) provided by server device 230 (e.g., before the response is provided to client device 210). In some implementations, security device 240 may receive one or more responses based on identifying one or more requests as being associated with the malicious script (e.g., when client device 210 sends one or more requests after security device 240 identifies the request as being associated with the malicious script). In some implementations, security device 240 may receive the one or more responses before the one or more responses are sent to client device 210.

As further shown in FIG. 4, process 400 may include modifying the response based on identifying the request as being associated with the malicious script (block 440). For example, security device 240 may modify the response, provided by server device 230, based on identifying the request as being associated with the malicious script executing on client device 210. In some implementations, security device 240 may modify the response when security device 240 receives the response (e.g., from server device 230).

The response may include a message, provided by server device 230, that includes a resource (e.g., an HTML file, an image file, a video file, an audio file, etc.) and/or other information requested by client device 210. For example, server device 230 may send a response to a request for an HTML file associated with a web address (e.g., a URL) of a website, hosted by server device 230, that includes the HTML file and/or other information associated with providing the HTML file to client device 210.

In some implementations, the response may include information that identifies client device 210, such as a network address associated with client device 210, a port number associated with client device 210, or the like. Additionally, or alternatively, the response may include information that identifies server device 230, such as a network address associated with server device 230, a port number associated with server device 230, or the like. Additionally, or alternatively, the response may include other information associated with providing the resource identified in the request, to client device 210.

In some implementations, security device 240 may modify the response by modifying information included in the response (e.g., by adding information, by removing information, by altering information, etc.). For example, security device 240 may modify the response by modifying information associated with a redirect included in the response (e.g., by removing a redirect location, by inserting a relative redirect location, by inserting a redirect to a basic authenticated URL, by inserting invalid characters into a redirect, etc.).

Additionally, or alternatively, security device 240 may modify the response by modifying information included in a response body associated with the response (e.g., by altering a coding scheme associated with the response body, by altering a content type indicated in the response, by incorrectly identifying a markup language associated with the response body, etc.).

Additionally, or alternatively, security device 240 may modify the response by modifying information associated with a compression application associated with the response (e.g., by incorrectly indicating that the response is gzipped, etc.). Additionally, or alternatively, security device 240 may modify the response by modifying a status code included in the response (e.g., by altering and/or randomizing an HTTP status code, etc.). Additionally, or alternatively, security device 240 may modify the response by modifying the response to include a malformed resource (e.g., by providing an HTML file that is missing closing tags, by providing an HTML file that includes tags that do not exist, etc.).

Additionally, or alternatively, security device 240 may modify the response by modifying information associated with a length header included in the response (e.g., by altering the length header such that the length header is larger than the amount of content being provided, by altering the length header such that the length header is a negative number, by altering the length header such that the length header is smaller than the amount of content being provided, etc.).

In some implementations, security device 240 may modify the response by altering other information included in the response (e.g., by inserting incorrect basic authentication headers, by inserting a link to a page with a null byte in a URL, by returning Extensible Stylesheet Language ("XSL") templates embedded into an Extensible Markup Language ("XML") document rather than HTML, by inserting an arbitrarily cached response to a request for a resource other than the arbitrarily cached response, etc.).

In some implementations, security device 240 may modify the response by fuzzing the response (e.g., by adding randomized information into the response, etc.). In some implementations, security device 240 may modify the response in another manner (e.g., the listed modifying techniques are not exhaustive of all possible modifying techniques). In some implementations, security device 240 may store information associated with one or more modification techniques (e.g., security device 240 may store a data structure of possible modification techniques). In some implementations, security device 240 may modify the response using one or more modification techniques to modify the response. Additionally, or alternatively, security device 240 may select (e.g., based on information associated with one or more modification techniques stored by security device 240) one or more modification techniques that are to be applied to the response. In some implementations, security device 240 may randomly select one or more modification techniques that are to be used to modify the response. Additionally, or alternatively, security device 240 may generate an arbitrary response (e.g., a response that is randomized and/or unrelated to the request), and may modify the response by replacing the response with the arbitrary response.

As further shown in FIG. 4, process 400 may include providing the modified response to the client device (block 450). For example, security device 240 may provide the modified response to client device 210. In some implementations, security device 240 may provide the modified response when security device 240 modifies the response. Additionally, or alternatively, security device 240 may provide the modified response when security device 240 receives information, indicating that the modified response is to be provided, from another device (e.g., server device 230).

In some implementations, security device 240 may provide the modified response to client device 210 via network 220. In some implementations, security device 240 may provide the modified response without providing information that indicates that security device 240 has modified the response (e.g., client device 210 may not be made aware that the response has been modified).

In some implementations, the modified response may cause the malicious script to experience a fatal error (e.g., the malicious script may not be capable of handling the modified response, and may crash). In this case, security device 240 may end communications with client device 210. Alternatively, the modified response may not cause the malicious script to experience a fatal error, and client device 210 may send an additional request based on executing the malicious script. In this case, process 400 may return to block 410 (e.g., security device 240 may receive the additional request), and security device 240 may provide a modified response to the additional request. In some implementations, security device 240 may select a different modification technique to modify the response to the additional request, and security device 240 may continue selecting one or more different modification techniques as additional requests, associated with the malicious script, are received by security device 240. In this way, security device 240 may continue providing modified responses (e.g., until security device 240 stops receiving requests from client device 210, until a particular modified response causes the malicious script to experience a fatal error, etc.) using a variety of modification techniques (e.g., stored by security device 240).

In this manner, security device 240 may identify a malicious script based on receiving a request from client device 210, and may provide a modified response in an attempt to cause the malicious script to experience a fatal error (e.g., an error that causes the script to crash).

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

FIGS. 5A-5E are diagrams of an example implementation 500 relating to example process 400 shown in FIG. 4. For the purposes of example implementation 500, assume that a client device, CD1, is running a malicious script that is designed to scrape content from a website, WebShop, hosted by a WebShop server. Further, assume that a WebShop security device is configured to identify malicious scripts and protect the WebShop server by attempting to crash the malicious script by providing fuzzed responses to requests associated with the malicious script.

Figure 5A:
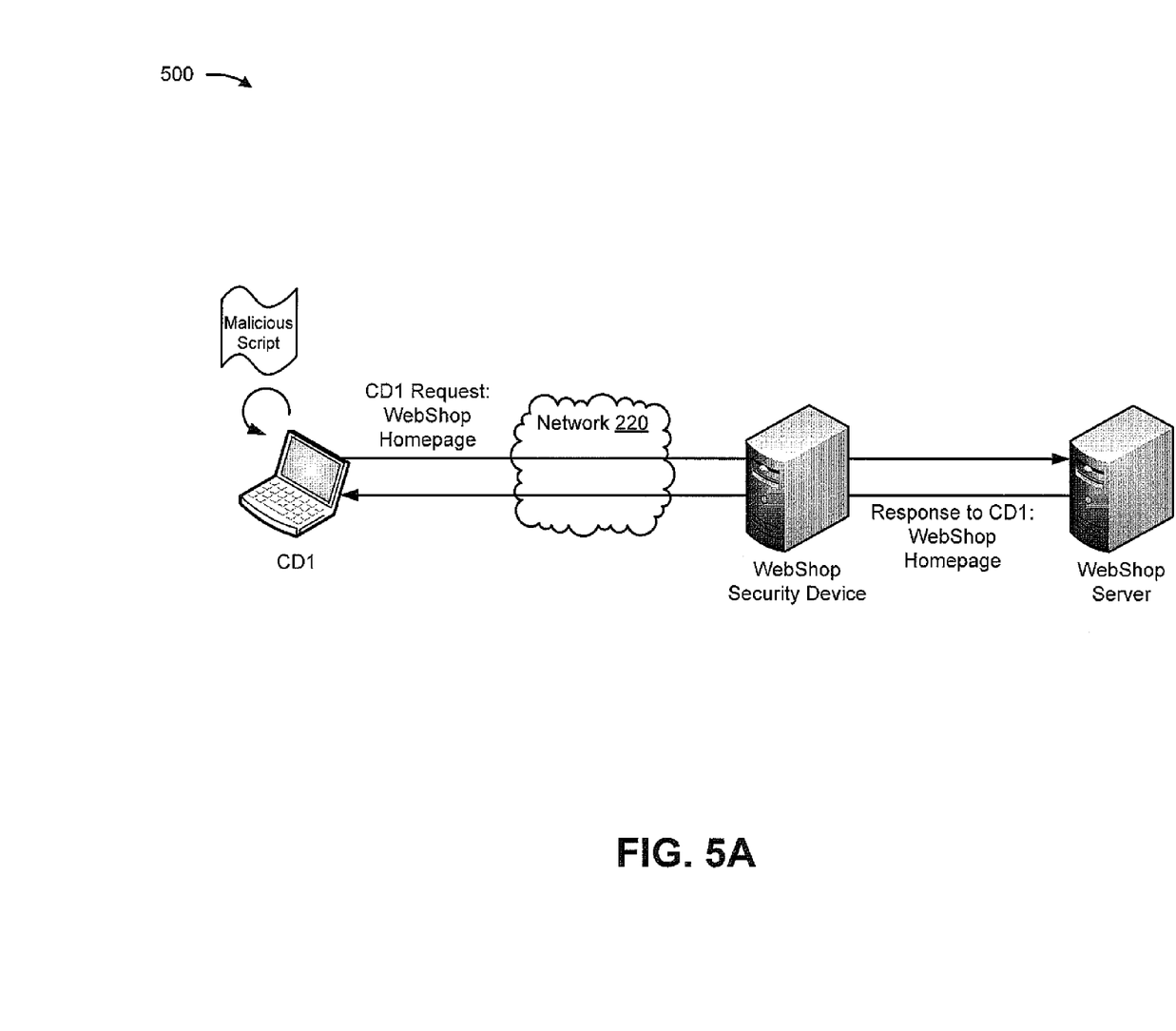
FIGS. 5A-5E are diagrams of an example implementation relating to the example process shown in FIG. 4.

As shown in FIG. 5A, assume that CD1 sends a request to receive information (e.g., an HTML file) associated with a WebShop homepage. As shown, the request may include information indicating that the request originated from CD1, and may indicate that CD1 wishes to receive the WebShop homepage from the Webshop server. As further shown, the WebShop security device may receive the request and may forward the request to the WebShop server. Assume that, at this point, the Webshop security device has not identified that the request is associated with a malicious script.

As further shown in FIG. 5A, the WebShop server may generate a response to the request, and may provide the response to CD1 (e.g., via the WebShop security device). As shown, the WebShop security device may not fuzz the response before providing the response to CD1 (e.g., since the WebShop device has not identified the request as being associated with a malicious script).

Figure 5B:
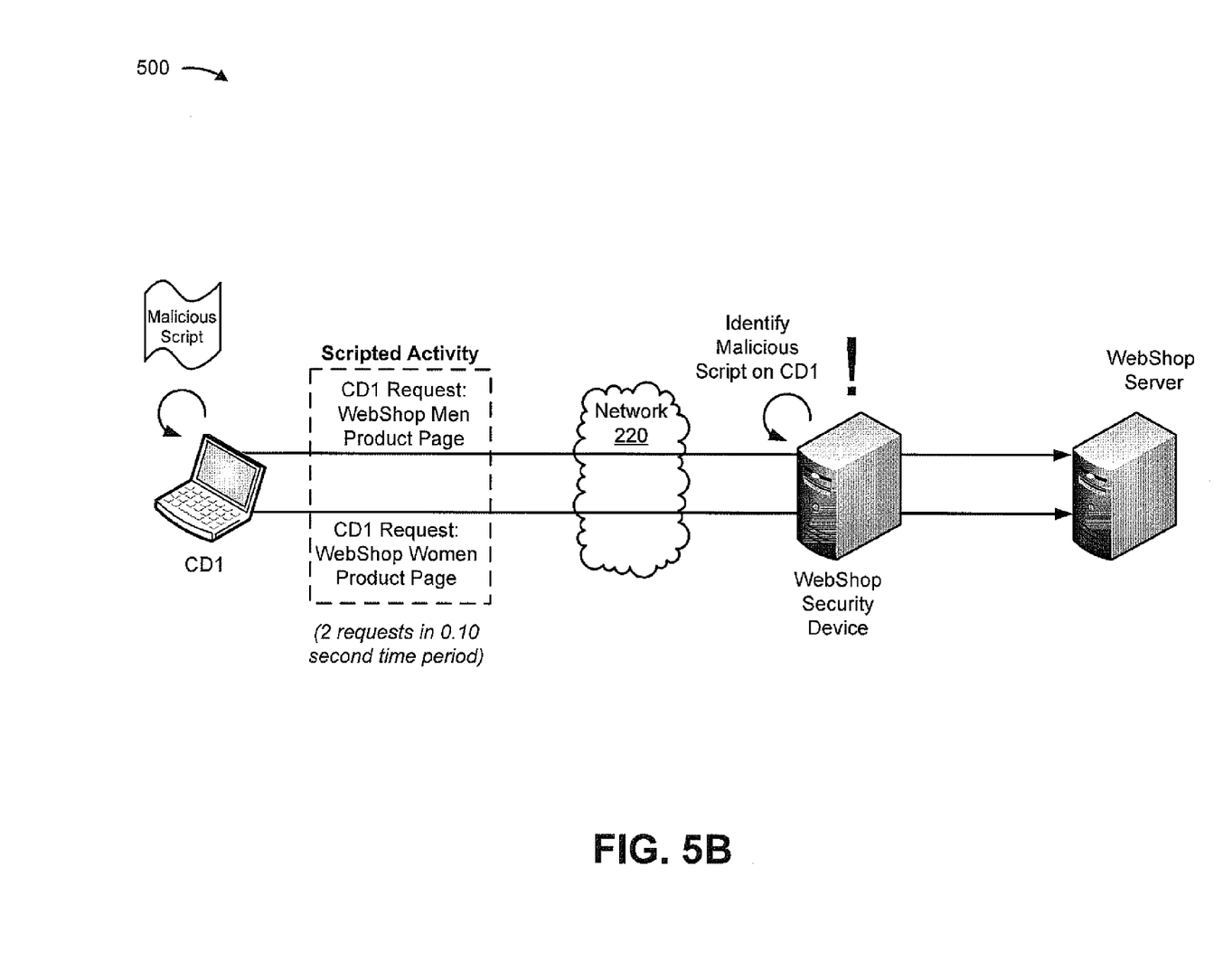

For the purposes of FIG. 5B, assume that the WebShop homepage (e.g., received by CD1) includes a link to a WebShop men product page, a link to a WebShop women product page, and a link to a WebShop kids product page. As shown in FIG. 5B, assume that CD1 sends two requests during a 0.10 second time period, including a request to receive the WebShop women product page and a request to receive the WebShop men product page. As further shown, the WebShop security device may receive the requests, and may identify the requests as being associated with a malicious script being run on CD1 (e.g., the WebShop security device may determine that the two requests, received in the 0.10 second time period, are indicative of malicious scripted activity). As shown, the WebShop security device may store information that identifies requests from CD1 as being associated with a malicious script. As further shown in FIG. 5B, the WebShop security device may forward the requests to the WebShop server.

Figure 5C:
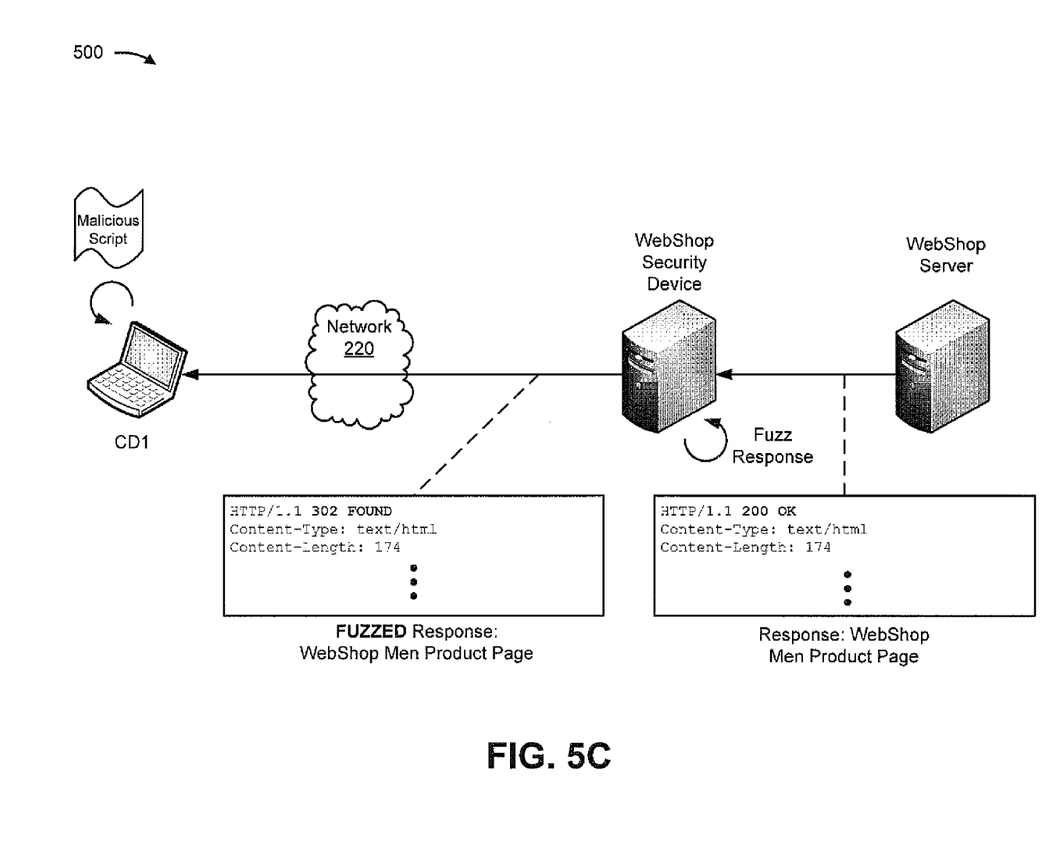

As shown in FIG. 5C, the WebShop server may generate and provide a response (e.g., a response associated with a successful HTTP request) to the request associated with the WebShop men product page. As shown, the response may include an HTTP status code (e.g. "200 OK") associated with the request, a content type associated with the request ("text/html"), a content length associated with the request (e.g., 174), and other content associated with the response (not shown). As further shown, the WebShop security device may receive the response (e.g., before sending the response to CD1). As shown, the WebShop security device may select a fuzzing technique and may use the selected technique to modify the response by altering the HTTP status code included in the response (e.g., by changing "200 OK" to "302 FOUND"). As further shown, the WebShop security device may provide the fuzzed response to CD1.

Figure 5D:
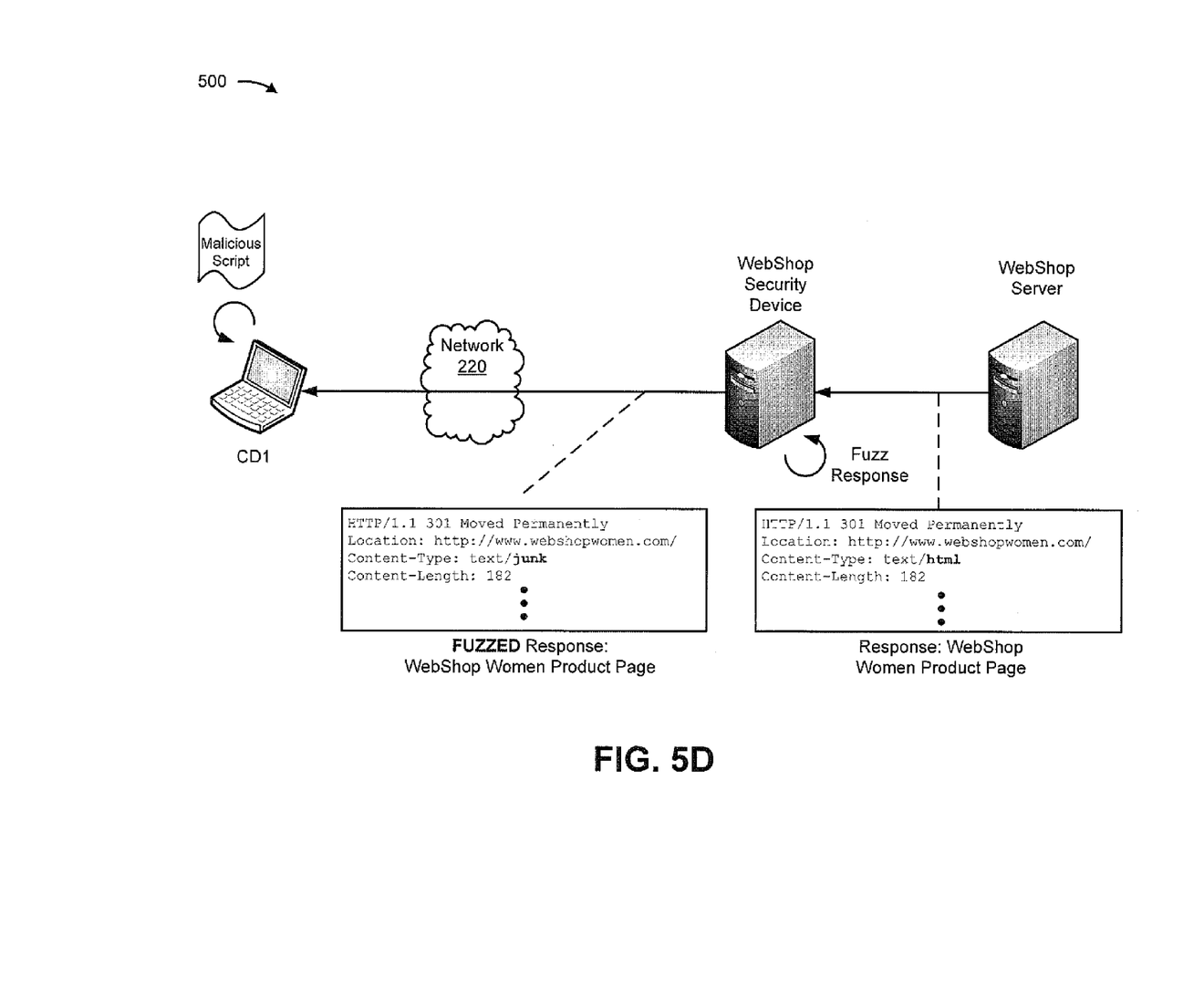

As shown in FIG. 5D, the WebShop server may generate and provide a response (e.g., a redirect) to the request associate with the WebShop women product page. As shown, the response may include an HTTP status code (e.g. "301 Moved Permanently") associated with the request, a location ("http://www.webshopwomen.com") associated with the request, a content type associated with the request ("text/html"), a content length associated with the request (e.g., 182), and other content associated with the response (not shown). As further shown, the WebShop security device may receive the response (e.g., before sending the response to CD1). As shown, the WebShop security device may select a fuzzing technique (e.g., a different technique than was used to modify the earlier response) and may use the selected technique to modify the response by altering the content type included in the response (e.g., by changing "text/html" to "text/junk"). As further shown, the WebShop security device may provide the fuzzed response to CD1.

Figure 5E:
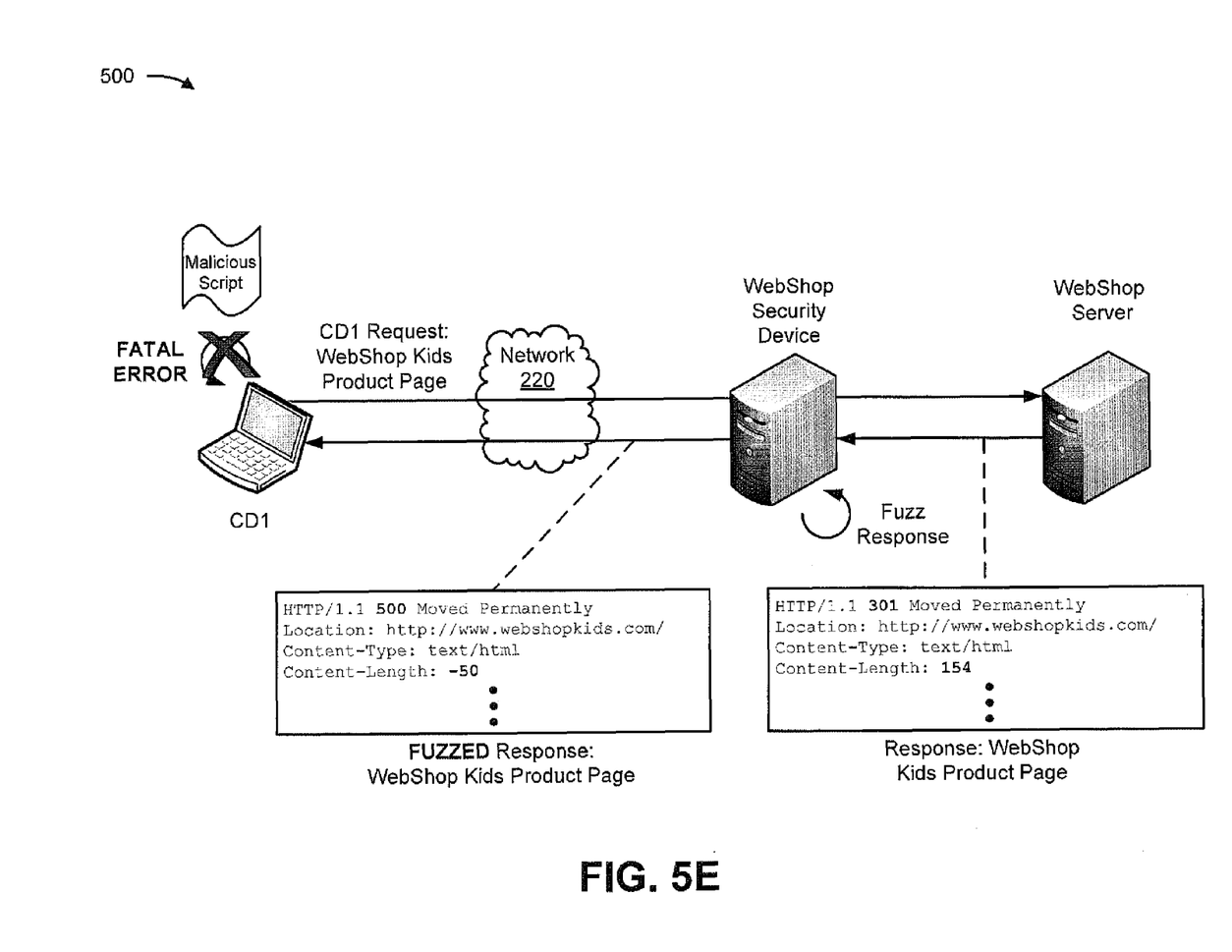

As shown in FIG. 5E, assume that the fuzzed responses, associated with the WebShop men product page and the WebShop women product page, did not cause the malicious script, running on CD1, to experience a fatal error. Further, assume that CD1 sends a third request, associated with the WebShop kids product page. As shown, the WebShop security device may identify the request as being associated with the malicious script (e.g., since the request was received from CD1), and may forward the request to the WebShop server. As further shown, the WebShop server may generate and provide a response (e.g., a redirect) to the request associate with the WebShop kids product page.

As further shown in FIG. 5E, the response may include an HTTP status code (e.g. "301 Moved Permanently") associated with the request, a location ("http://www.webshopkids.com") associated with the request, a content type associated with the request ("text/html"), a content length associated with the request (e.g., 154), and other content associated with the response (not shown). As further shown, the WebShop security device may receive the response (e.g., before sending the response to CD1). As shown, the WebShop security device may select two fuzzing techniques and may use the selected techniques to modify the response by altering the HTTP status code included in the response (e.g., by changing 301 to 500) and may also alter the content length in the response (e.g., by changing 154 to −50). As further shown, the WebShop security device may provide the fuzzed response to CD1.

As further shown, the fuzzed response, associated with the WebShop kids product page may cause the malicious script, running on CD1, to experience a fatal error (e.g., causing the malicious script to crash), and the WebShop security device may not receive any additional requests from CD1. In this manner, the WebShop security device may provide fuzzed responses to CD1 until the malicious script crashes (e.g., until CD1 ceases sending requests to the WebShop server).

As indicated above, FIGS. 5A-5E are provided merely as an example. Other examples are possible and may differ from what was described with regard to FIGS. 5A-5E.

Implementations described herein may allow a security device, associated with a server device, to provide a modified response to a client device running a malicious script in an attempt to cause the malicious script to crash (e.g., thereby protecting the server device from the malicious script).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A security device, comprising:
one or more processors to:
receive a request, from a client device and intended for a server device, to provide a resource,
the resource being associated with information stored by the server device;
the client device executing a malicious script that performs one or more undesirable tasks directed to the server device,
the request being transmitted by the client device based on the client device executing the malicious script;
identify the request as being associated with the malicious script based on one or more of:
one or more other requests received from the client device,
a quantity of requests, received from the client device, within a particular amount of time, or
a score indicating a probability that the request is associated with the malicious script;
receive, from the server device, a response to the request,
the response including information associated with the resource;
modify the response to form a modified response,
the response being modified in an attempt to cause the malicious script to experience an error; and
provide the modified response to the client device to cause the malicious script, executing on the client device, to experience an error.

2. The security device of claim 1, where the one or more processors are further to:
generate an arbitrary response,
the arbitrary response including information that is unrelated to the request; and
where the one or more processors, when modifying the response, are to:

modify the response by replacing the response with the arbitrary response.

3. The security device of claim 1, where the one or more processors are further to:
randomly select a modification technique from a plurality of modification techniques; and
where the one or more processors, when modifying the response, are to:
modify the response using the randomly selected modification technique.

4. The security device of claim 1, where the one or more processors, when modifying the response, are to:
modify a first portion of the information included in the response using a first modification technique; and
modify a second portion of the information included in the response using a second modification technique.

5. The security device of claim 1, where the one or more processors when modifying the response, are to:
add particular information to the response,
the particular information including a relative redirect location, a basic authenticated URL, or invalid characters into a redirect, and
at least one of:
remove information included in the response; or
alter information included in the response.

6. The security device of claim 1, where the one or more processors are further to:
select a modification technique from a plurality of modification techniques; and
where the one or more processors, when modifying the response, are further to:
modify the response using the selected modification technique.

7. The security device of claim 1, where the request is a first request, the response is a first response, and the modified response is a first modified response:
the first response being modified using a first modification technique; and
where the one or more processors are further to:
receive a second request from the client device and intended for the server device;
identify the second request as being associated with the malicious script;
receive, from the server device, a second response to the second request;
modify the second response using a second modification technique to form a second modified response,
the second modification technique being different from the first modification technique; and
provide the second modified response to cause the malicious script to experience an error.

8. A computer-readable medium storing instructions, the instructions comprising:
one or more instructions that, when executed by one or more processors, cause the one or more processors to:
receive, from a client device executing a script, a request for information stored by a server device,
the script including an automated performance of one or more undesirable tasks directed to the server device,
the request being transmitted by the client device based on the client executing the script;
determine that the request is associated with the script based on one or more of:
one or more other requests received from the client device,
a quantity of requests, received from the client device, within a particular amount of time, or
a score indicating a probability that the request is associated with the script;
receive a response to the request,
the response including information associated with the information stored by the server device,
the response being provided by the server device;
modify the response to form a modified response,
the response being modified to alter the information included in the response; and
provide, to the client device, the modified response to cause the script to experience an error that causes the script to crash.

9. The computer-readable medium of claim 8, where the one or more instructions, when executed by the one or more processors, further cause the one or more processors to:
generate an arbitrary response,
the arbitrary response including information that is unrelated to the request; and
where the one or more instructions, that cause the one or more processors to modify the response, cause the one or more processors to:
modify the response by replacing the response with the arbitrary response.

10. The computer-readable medium of claim 8, where the one or more instructions, when executed by the one or more processors, further cause the one or more processors to:
randomly select a modification technique from a plurality of modification techniques; and
where the one or more instructions, that cause the one or more processors to modify the response, cause the one or more processors to:
modify the response using the randomly selected modification technique.

11. The computer-readable medium of claim 8, where the one or more instructions, that cause the one or more processors to modify the response, cause the one or more processors to:
modify a first portion of information included in the response using a first modification technique; and
modify a second portion of information included in the response using a second modification technique.

12. The computer-readable medium of claim 8, where the one or more instructions, that cause the one or more processors to modify the response, cause the one or more processors to at least one of:
add information to the response;
remove information included in the response; or
alter information included in the response.

13. The computer-readable medium of claim 8, where the one or more instructions, that cause the one or more processors to provide the modified response, cause the one or more processors to:
select a modification technique from a plurality of modification techniques; and
where the one or more instructions, that cause the one or more processors to modify the response, cause the one or more processors to:
modify the response using the selected modification technique.

14. The computer-readable medium of claim 8, where the request is a first request, the response is a first response, and the modified response is a first modified response:
the first response being modified using a first modification technique; and where the one or more instructions, when executed by the one or more processors, further cause the one or more processors to:
receive a second request from the client device and intended for the server device;
determine that the second request is associated with the script;
receive, from the server device, a second response to the second request;
modify the second response using a second modification technique to form a second modified response,
the second modification technique being different from the first modification technique; and
provide the second modified response to cause the script to experience an error that causes the script to crash.

15. A method, comprising:
receiving, by a security device, a request to provide information associated with a resource associated with a server device,
the request being received from a device based on the device executing a script that performs one or more undesirable tasks on the server device;
identifying, by the security device, the request as being associated with the script that performs the one or more undesirable tasks on the server device,
the request being identified based on:
one or more other requests received from the device,
a quantity of requests, received from the device, within a particular amount of time, or
a score indicating a probability that the request is associated with the script;
receiving, by the security device, a response associated with the request,
the response being provided by the server device;
modifying, by the security device, the response associated with the request,
modifying the response including altering one or more portions of information included in the response; and
sending, by the security device, the modified response to attempt to cause the script to crash.

16. The method of claim 15, further comprising:
generating an arbitrary response,
the arbitrary response including information that is unrelated to the request; and
where modifying the response comprises:
modifying the response by replacing the response with the arbitrary response.

17. The method of claim 15, further comprising:
randomly selecting a modification technique from a plurality of modification techniques; and
where modifying the response comprises:
modifying the response using the randomly selected modification technique.

18. The method of claim 15, where modifying the response comprises:
modifying a first portion of the information included in the response using a modification technique; and
modifying a second portion of the information included in the response using a second modification technique.

19. The method of claim 15, where modifying the response includes at least one of:
adding information to the response;
removing information included in the response; or
altering information included in the response.

20. The method of claim 15, where the request is a first request, the response is a first response, and the modified response is a first modified response:
the first response being modified using a first modification technique; and
where the method further comprises:
receiving a second request to provide information associated with a resource associated with a server device;
identifying the second request as being associated with the script;
receiving, from the server device, a second response to the second request;
modifying the second response using a second modification technique to form a second modified response;
the second modification technique being different from the first modification technique; and
sending the second modified response to attempt to cause the script to crash.

* * * * *